UNITED STATES PATENT OFFICE.

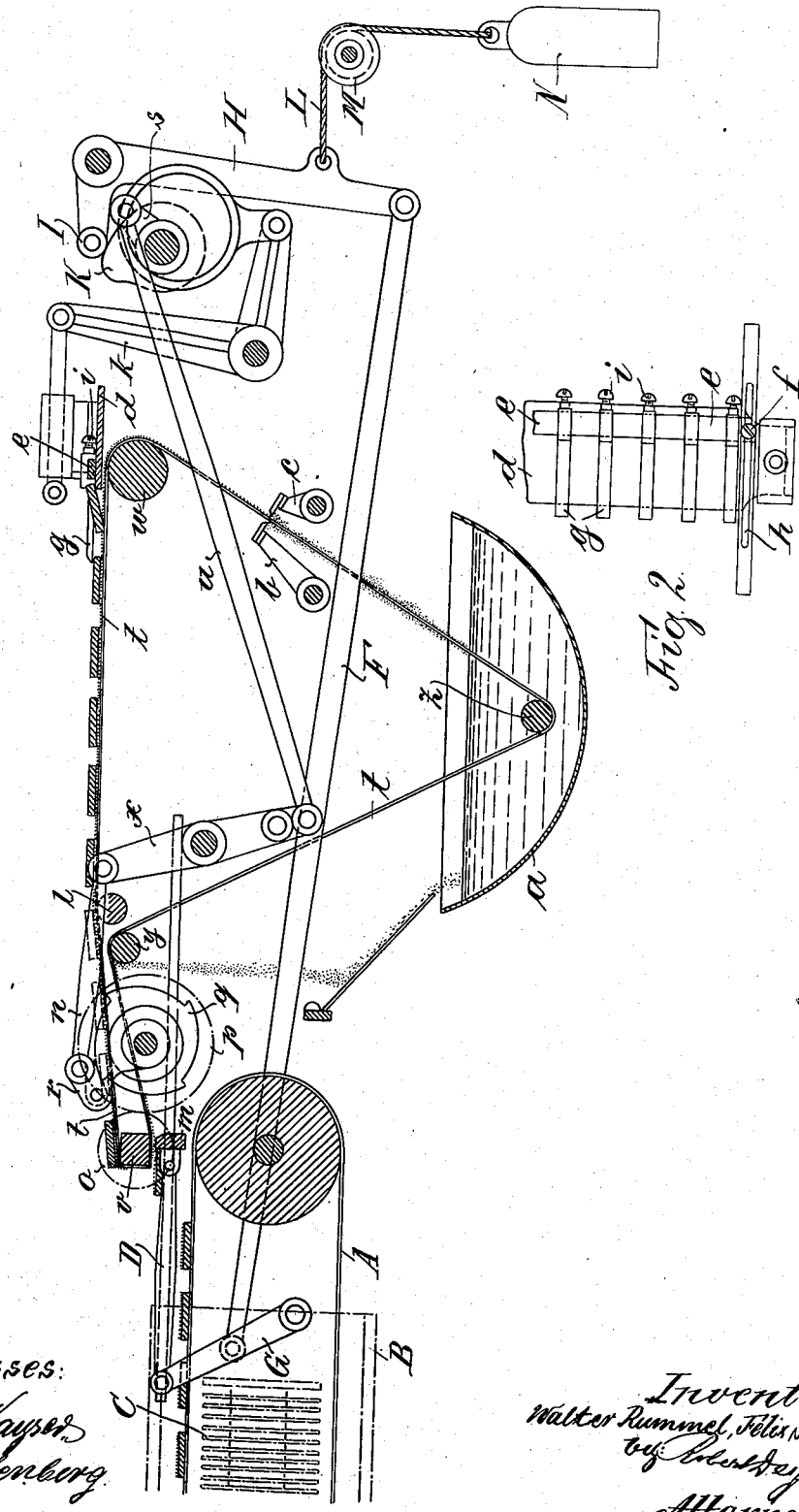

WALTER RUMMEL AND FELIX SCHMIDT, OF HAMBURG, GERMANY, ASSIGNORS TO THE FIRM OF H. DANGER, OF HAMBURG, GERMANY.

MACHINE FOR GLAZING BISCUITS.

No. 858,542.   Specification of Letters Patent.   Patented July 2, 1907.

Application filed January 4, 1907. Serial No. 350,809.

*To all whom it may concern:*

Be it known that we, WALTER RUMMEL and FELIX SCHMIDT, both subjects of the King of Prussia, German Emperor, and residents of the free town of Hamburg, in the German Empire, have invented a new and useful Machine for Glazing Biscuits, of which the following is an exact specification.

Our invention relates to a machine by means of which a one-sided, perfectly even and uniform coating of biscuits and similar articles with a sugar-mass is accomplished in a very simple and reliable way. To this purpose the biscuits are placed with the sides to be coated upon a conveyer by means of a feeding arrangement hereinafter described. This conveyer,—an endless band—provided on the upper side with a layer of sugar of proper thickness runs over a roller of a square section which makes turns of 180° at regular intervals of time. Now the biscuits fed upon the conveyer band are carried on over the roller until they reach the lower side of the latter one, whence they are scraped off by a plate moving in a horizontal direction. This scraping off tion has to be thus adjusted to take place immediately after the finish of each turn of the square roller, i. e. after one side of the roller faces the ground and with it an adhering biscuit on the conveyer. As the biscuits are scraped off in turn they drop upon a second endless band but with the coated side up and are conveyed through a heated chamber in order to be dried, on the other side of which they drop into suitable boxes or baskets.

In order to make our invention better understood we accompany same with a drawing, where Figure 1 represents a sectional side-view of a constructional form of the machine, and Fig. 2 a top view of the feeding appliance.

Here *a* represents a vessel filled with the liquid coating substance, e. g. sugar. Through this sugar-bath the endless conveying band *t* is carried, thus being coated with a thick layer on both sides, when coming out of the bath. While ascending the band passes two scraping knives, one on each side. The inner one *b* is placed in close contact with the inner surface of the band, in order to make a clean scrape; the outer knife *c* is set so as to allow a certain thickness of the sugar coat to pass on, whereas the surplus is scraped off. By means of this arrangement the inner surface of the traveling band is freed entirely of the sugar coat, whereas on the outer surface a perfectly even coating is carried on over a roller *w* and under the feeder arrangement the latter consisting of a reciprocating table *d*, a fixed cross piece *e*, going across the whole length of the table *d* and a suitable number of small partition plates *g*. The position of the fixed cross piece *e* can be adjusted across the width of the table by a screw *f* and a slot *h*, as shown in Fig. 2. The partition plates *g* are adjustably fastened to the cross piece *e* by means of screws *i*, so that the space between them can be regulated according to requirements, i. e. the width of the biscuits placed between. The reciprocating motion of the table is imparted to same by means of the lever arrangement *k* in suitable connection with the main driving power.

The biscuits are placed by hand upon the table *d* between the partition plates *g* with the side to be coated turned toward the table. Now, if this table moves backwards, the biscuits hit against the fixed cross piece *e* and are pushed off the table thereby, dropping upon the coated upper surface of the conveyer band *t*. The latter one passes over a small intermittent roller *l* on to a square shaped roller *v* and thence over another small roller *y* to the bottom roller *z* in the sugar tank *a*. The square roller *v* has a gear wheel *o* fixed to it that meshes into another gear wheel *p*. Keyed to the same shaft of the latter wheel is a ratchet *q* moved by a pawl *r*. This pawl is driven by an eccentric *s* by means of suitable connection rods *u* and *n* and a pivoted rocker lever *x*. The jerking motion imparted by the pawl *r* to the ratchet *q* has to be such, that each turn of the eccentric *s* will cause the square roller *v* to be turned 180°, which result is achieved by the proper relation of the meshing gear wheels *o* and *p*. This jerking motion of the square roller *v* is transferred to the conveying band *t*, the latter carrying along each biscuit placed on same with a likewise interrupted motion, until it reaches the upward facing side on the square roller. The next jerk imparted to this roller will cause this upward directed side to face down. In moving it pulls along the band portion on top of it, and the biscuit, by means of the adhesive power of the sugar coat and on account of its own lightness sticks to the band and is carried along to the under side of the square roller also, making thereby a complete turn of 180°. As soon as this turn is completed, a scrape off plate *m* arranged at the lower side of the square shaft *v* is put in a horizonal motion, by means of which the adhering biscuit is pushed off the band and dropped with the glazed surface upward upon a second endless band A, which runs through a chamber B, the latter being heated by a coil C. The glazed biscuits dropped upon the second band A are conveyed through this chamber for the purpose of being dried and after this final manipulation they are at the other end of the chamber dropped into a suitable basket or box placed there for the purpose.

The movement of the scraper *m* is accomplished by means of a separate lever-construction, indicated on the drawing by connecting rods D and F, and pivoted rocker levers G and H. The latter lever has two projecting arms, of which the upper one carries a roller I, that travels upon the out-line of the cam K, the latter is firmly attached to the same shaft of eccentric *s*. To the lower projection of lever H a cable L is attached, that runs over a trolley M and carries a weight N at its end for the purpose of assuring a continued contact between the roller I and the cam K.

The afore mentioned square section of the roller v forms a very essential part of our invention, for if the roller be round, the biscuits would be pushed back to the upper side of the band t on account of the strong adhesive power of the sugar mass, as has been proved by numerous experiments made. The prismatic shape of the roller v firstly hinders a pushing back of the biscuits, secondly assures a reliable and complete turn of the biscuit and, thirdly, renders possible a scraping off by a horizontal movement and sure dropping of the biscuit with glazed side up. The square sectioned form has been selected by us as being the most suitable and practical section, but any other sharp-cornered section, for instance, a triangle, a pentagon, a hexagon or an octagon could be employed without departing from the principal idea of our invention.

Having thus fully described the nature of our said invention, what we desire to secure by Letters Patent of the United States is:—

1. In a machine for the purpose of glazing biscuits and articles of similar character on one side automatically a feeder appliance, consisting of a reciprocating table (d), a fixed cross piece c, adjustably arranged by slot h and screw f as to its position across the width of the table, a suitable number of partition plates g, adjustably arranged on crosspiece c for the purpose set forth, and an endless band t stretched over rollers and conducted through a sugar tank a and underneath the table d, upon which band the biscuits are dropped with the surface to be coated by the feeder.

2. In a machine for the purpose of glazing biscuits and articles of similar character on one side automatically a prismatic shaped roller (v), best of a square section, over which the endless band (t) is stretched and which is placed at the end of the machine, where the biscuits are to be taken off the endless band (t).

3. In a machine for the purpose of glazing biscuits and articles of similar character on one side automatically a prismatic shaped roller (v) best of a square section, over which the endless band (t) is stretched and means for turning the roller 180° at regular intervals of time, causing thereby a corresponding moving of the endless band for the purpose set forth.

4. In a machine for the purpose of glazing biscuits and articles of similar character on one side automatically a feeder appliance in combination with a prismatic roller of a sharp cornered section being turned suitable degrees according to the form of section selected an endless band t stretched over said prismatic roller v and a horizontally moved scrape off plate (m) arranged below the prismatic roller (v) for the purpose of detaching the coated biscuits from the endless band and dropping same on a second conveying band (A) with their coated surface up.

5. In a machine for the purpose of glazing biscuits and articles of similar character on one side automatically the combination of a feeder appliance with a prismatic roller v of a sharp cornered section, means for turning the roller suitable degrees according to the form of section selected at regular intervals of time, an endless band t stretched over said roller v, a scrape-off plate m and the means of moving the latter in a horizontal direction consisting of cam K, roller I, in connection with rod F and D and rocker G and H.

6. In a machine for the purpose of glazing biscuits and articles of similar character on one side automatically the combination of a feeder appliance d, e, g with a prismatic roller r of a sharp cornered section, means for turning the roller suitable degrees according to the form of section selected at regular intervals of time, an endless band t stretched over said roller v, a scrape-off plate m means for moving same horizontally and two scrape-off knives e and b one attached to the inner and one to the outer surface of the traveling band t for the purpose as described and set forth.

In witness whereof we have hereunto set our hand in the presence of two witnesses.

WALTER RUMMEL.
FELIX SCHMIDT.

Witnesses:
OTTO W. HELLMRICH,
IDA CHRIST. HAFERMANN.